United States Patent
Jensen et al.

(10) Patent No.: US 7,812,933 B2
(45) Date of Patent: Oct. 12, 2010

(54) ELECTRO-OPTICAL RANGE FINDER

(75) Inventors: Thomas Jensen, Rorschach (CH); Peter Kipfer, Marbach (CH); Laurent Stauffer, Widnau (CH); Reto Stutz, Berneck (CH)

(73) Assignee: Leica Geosystems AG, Heerbrugg (CH)

(*) Notice: Subject to any disclaimer, the term of this patent is extended or adjusted under 35 U.S.C. 154(b) by 41 days.

(21) Appl. No.: 12/306,715

(22) PCT Filed: Jul. 12, 2007

(86) PCT No.: PCT/EP2007/006170
§ 371 (c)(1), (2), (4) Date: Mar. 2, 2009

(87) PCT Pub. No.: WO2008/009381
PCT Pub. Date: Jan. 24, 2008

(65) Prior Publication Data
US 2009/0279069 A1    Nov. 12, 2009

(30) Foreign Application Priority Data
Jul. 17, 2006    (EP) ............................ 06117303

(51) Int. Cl.
*G01C 3/08*    (2006.01)
(52) U.S. Cl. ................................. 356/5.01; 356/4.01
(58) Field of Classification Search ............. 356/4.01, 356/5.01
See application file for complete search history.

(56) References Cited

U.S. PATENT DOCUMENTS

| | | | | |
|---|---|---|---|---|
| 5,594,543 A | * | 1/1997 | de Groot et al. | ........... 356/5.09 |
| 7,480,316 B2 | * | 1/2009 | Gachter et al. | ................ 372/18 |

FOREIGN PATENT DOCUMENTS

| | | |
|---|---|---|
| DE | 19717571 | 10/1998 |
| EP | 1 150 097 A1 | 10/2001 |
| EP | 1 517 415 A1 | 3/2005 |
| EP | 0738899 | 12/2008 |
| WO | 01/84077 | 11/2001 |
| WO | 2005/029114 | 3/2005 |

OTHER PUBLICATIONS

Kallenbach S, et al "High-power high-brightness ridge-waveguide tapered diode lasers at 14xx nm" Proceedings of the SPIE, vol. 5738, No. 1, 2005, pp. 406-415, xp002411981 Bellingham, USA.
(Continued)

*Primary Examiner*—Isam Alsomiri
(74) *Attorney, Agent, or Firm*—Workman Nydegger (57) ABSTRACT

An electro-optical range finder (4) having a trapezoidal laser (1) as a laser source, a laser source controller (6) for generating pulsed laser radiation, receiving optics (7) and a detector (8) with an evaluation unit (9) for receiving and evaluating the measuring radiation (RS) reflected by a target (ZI), in order to measure distance, has a separate supply for the guided waveguide region (2) and the trapezoidal region (3) as well as transmitting optics (5) with astigmatism compensation and for collimating the laser radiation.

17 Claims, 5 Drawing Sheets

OTHER PUBLICATIONS

Sheng-Hui Yang, et al "Generation of High-Power Picosecond Pulses from a Gain-Switched Two-Section Quantum-Well laser with a Laterally Tapered Energy-Storing Section" IEEE Photonics Technology Letters, IEEE Service Center, Piscataway, NJ, US, vol. 8, No. 3, Mar. 1996 XP011048176 ISSN: 1041-1135.

Pfahler C, et al "Gain saturation and high-power pulsed operation of GaSb-based tapered diode lasers with separately contacted ridge and tapered section" Applied Physics Letters, AIP, American Institute of Physics, Melville, NY, US, vol. 89, No. 2, Jul. 12, 2006, pp. 21107-1-21107-3, XP012086920 ISSN: 0003-6951.

* cited by examiner

ELECTRO-OPTICAL RANGE FINDER

BACKGROUND OF THE INVENTION

The invention relates to an electro-optical range finder.

In many geodetic applications, the emission of laser light is required or advantageous. This relates in particular to electro-optical distance measurement with geodetic accuracies, which are typically in the millimeter or submillimeter range and are achievable, for example, by the pulse transit time meter or phase meter principles. Suitable methods and apparatuses of the generic type for distance measurement are described, for example, in EP 0 738 899 B1 or WO2004/074773.

The measurement of distances over the relatively large distances required for geodetic applications sets high requirements with regard to the beam source. For highly accurate distance measurements, it is advantageous if the radiation source provides radiation having a well defined optical pulse shape. For an accurate distance measurement according to the transit time measuring principle, the beam source must therefore be pulsed in the ns range, have a high pulse peak power and have very good beam quality, for example a flat, not curved, emission wavefront.

The requirements resulting from this important field of use with regard to the laser emission of geodetic devices relate to the power and the mode structure. While powers in the mW range are achieved in the case of continuous emission, it is advantageous, for distance measurements over relatively large distances, to achieve powers in the range of a few 10 W, which can be achieved in the pulse mode in particular by short but high-energy pulses. In addition, a beam cross-section which is as small and homogeneous as possible should be provided so that resolution of small structures is also possible. The beam cross-section or the beam profile should as far as possible remain constant over the entire measured distance or should change only slightly.

In geodetic distance measurements of the prior art, laser diodes are frequently used as laser sources. However, these semiconductor lasers have the disadvantage that they emit in multimode operation and, as edge emitters, have a geometrically unfavourable beam cross-section.

Thus, various approaches for converting the emission of a laser source by suitable choice of the laser type, special mode of operation and beam shaping means into a form useable for geodetically precise applications exist in the prior art.

For example, WO 01/84077 discloses an optical range finder which deflects the part-beams of an edge-emitting laser diode through a downstream beam forming optical system and guides them onto the aperture of an objective lens so that they substantially fill said aperture. However, the emission of the laser diode still has a multimode characteristic.

The combination of the emission of many individual laser diodes of an array into a common beam, which combination is also possible for increasing the power, also has the disadvantage of poor coherence.

Commercial narrow-stripe semiconductor lasers available today and having an emission area of 1×3 μm permit diffraction-limited radiation but are suitable only for the pulsed range of less than 1 W pulse peak power with a still acceptable lifetime, e.g. of 5000 h. Higher pulse peak or peak powers lead to irreversible damage to the optical exit facette (catastrophic optical damage, COD).

Broad-stripe emitters designed for a higher power range and having emission widths of 100-500 μm are loadable with regard to the maximum pulse power in less than 1 μsec up to a few 10 watt in the pulse mode but have a very poor radiation characteristic, i.e. multimode operation. The beam shaping by means of a diffractive element or the incorporation into an external cavity permits the optimisation of the radiation characteristic but with considerable effort, for example with regard to the resonator adjustment or with substantially limited quality in comparison with narrow-stripe emitters (diffractive solution).

EP 1 517 415 and WO 2005/029114 disclose, for improving the emission of laser radiation in a geodetic device, a laser source in which the radiation of multimodally emitting laser diodes is influenced by a mode-selective component so that the laser radiation emitted by the laser source has monomodal character. For this purpose, it is proposed to operate an edge emitter or a vertical semiconductor emitter with an external cavity in which a mode-selective component is present, for example a monomodal fibre or resonator mirror, which result in a mode-selective resonator structure. For compensation of the greater pulse duration achieved by the lengthened cavity, components having a negative dispersion can be used for pulse compression.

In addition, it is possible in principle also to use other laser types, for example microchip solid-state lasers in single-mode operation, pumped by semiconductor lasers, in geodetic devices. However, these have the disadvantage of large dimensions, high energy consumption and an unfavourable operating characteristic, for example owing to thermal effects. As a result, the suitability of such solutions in practice for use for surveying in the field is limited.

Diode-pumped solid-state lasers meet the requirements with regard to the beam quality and the peak power but are very complicated with respect to the concept (pumped laser with actuation, coupling-in optical system, amplification medium, quality circuit, resonator) and expensive. They also generally permit flexible adaptation of the pulse rate since this is a limiting factor due to the high thermal load in combination with lower efficiency.

SUMMARY OF THE INVENTION

An object of the present invention is to provide a geodetic measuring device comprising a laser source whose emission has improved beam quality at the same power or a higher power with the same beam quality or both higher power and improved beam quality.

A further object of the present invention is to permit structural improvements with regard to size, complexity, energy consumption and/or design for a geodetic measuring device comprising a laser source.

These objects are achieved, according to the invention, by the features of Claims 1, 11 or 12 and by features of the dependent claims or these solutions are further developed.

The invention is based on the integration of tapered diode lasers into geodetic range finders. Tapered diode lasers or single-mode single-emitter semiconductor lasers, as described, for example, in DE 197 17 571 or WO 98/49759, are commercially available for cw laser operation in the region of a few watt. They consist of a ridge waveguide which has very good beam quality similar to a narrow-stripe emitter and is coupled to a tapered waveguide which in practice picks up the output mode and internally amplifies it. Thus, theoretical output powers of a few watts cw with virtually diffraction-limited beam quality of $M_2<1.5$ are achievable.

What is problematic is the integration of a tapered diode laser into a geodetic device. The emission area of typically 1×200 μm is comparable with a broad-stripe emitter but the emission has very strong astigmatism. The beam waist is at the emitter surface in the rapidly divergent axis or fast axis, whereas, in contrast to the broad-stripe emitter, the apparent emission point is not at or in the vicinity of the emitter surface in the slow axis but at the transition from the ridge waveguide to the tapered waveguide. Owing to the strong asymmetrical structure, tapered diode lasers have very high astigmatism of about 600 μm at a tapered length of 2 mm.

For use in a geodetic device, this requires the adaptation of a special optical system for compensation of the astigmatism and simultaneous collimation for generically required surveying of targets at a great distance, parallel symmetrization of the beam cross-section also being advantageous. The divergence of the emission points in the two axes must therefore be corrected or compensated by the optical system 1 and target illumination must be permitted even over relatively large distances. The astigmatism correction required with the use of tapered diode lasers as a radiation source differs here from the usual beam-influencing measures in the case of narrow-stripe emitters since in these the astigmatism is smaller by two orders of magnitude and requires no corrections.

With an appropriate design of the optical system, efficient coupling into a monomodal fibre is also possible so that positioning of the tapered diode laser and of the pulsed actuating electronics independently of the optical system is possible.

For operation of the tapered diode laser in a geodetic range finder, an electrical pulse circuit which, depending on resolution and measuring speed for a transit time measurement, gives pulse lengths between 1 ns and a few 10 ns at repetition rates up to 1 MHz is used as a control. Owing to the relatively large emission surface of the tapered laser diodes, output powers of more than 25 W at pulse lengths of 5-10 ns and with product-relevant lifetimes can be realised. The pulse powers are hence comparable to broad-stripe emitters but with about 22 times higher beam density.

On measurements to non cooperative targets, as frequently surveyed, for example, in the form of naturally rough surfaces, problems which influence the achievable accuracy arise through the pulsed operation of the tapered diode laser. Geodetically precise measurements usually require a high precision of the distance measurement down to the submillimeter range and high repeatability which as far as possible should be independent of the material surface or a special point of incidence.

If a tapered diode laser is operated electrically in the pulsed mode, the energy distribution over the longitudinal modes of the laser varies over the duration of the transient phenomenon of the ridge waveguide. As a result of this, the spectral distribution shifts over the duration of a pulse, i.e. the spectrum components are time-dependent. This dependence may influence the accuracy of measurement or repeatability in the case of rough surfaces owing to the resultant speckles. Rough surfaces can show a strong spectral dependence owing to the occurrence of speckles in the observation plane, which leads to spectrally different responses. Since early or later parts of a pulse are preferentially reflected in each case owing to the spectrally dependent reflectivity, the result is a shifting of the detectable peak of the pulse in its position as a function of time. The measurement thus experiences a dependence on the surface or the lateral position on the target. Further optimisation of the actuation of the tapered diode laser can therefore be achieved via a separate supply of the ridge waveguide and of the tapered waveguide. In this case, the diode driver may consist of two regions which permit different actuation, in particular provide different currents. The ridge waveguide can be kept in continuous wave operation so that only the tapered waveguide is operated in the pulsed mode.

Owing to the on average very low thermal loading of the tapered diode laser in the pulsed mode—a few mW—compared with the design in the cw mode—a few watt—in general thermal lens formation which has an extremely adverse effect on the beam quality in the tapered wave guide can be neglected.

The introduction of a grating structure, e.g. as a DFB (distributed feedback) in the ridge waveguide, permits not only spatial monomodality but also spectral monomodality (single frequency), which facilitates the surveying of rough, non cooperative targets since single-frequency operation does not give rise to any fluctuations of the speckle pattern which might lead to falsification of the distance information.

By the use of a corresponding actuation, optionally supplemented by the adaptation of the laser diode and of an optical system taking into account the characteristic of the tapered diode laser, tapered diode lasers can also be used for geodetic devices or said lasers can be improved so that their possibilities with respect to range, accuracy of measurement—both in distance and laterally—and measuring speed can be increased or, with the same parameters, the effort and the complexity can be reduced.

BRIEF DESCRIPTION OF THE INVENTION

An electro-optical range finder according to the invention and a geodetic surveying device and laser sources according to the invention which are suitable for this purpose are described in more detail below, purely by way of example, with reference to working examples shown schematically in the drawing. Specifically.

DETAILED DESCRIPTION OF THE DRAWINGS

Figure 1:
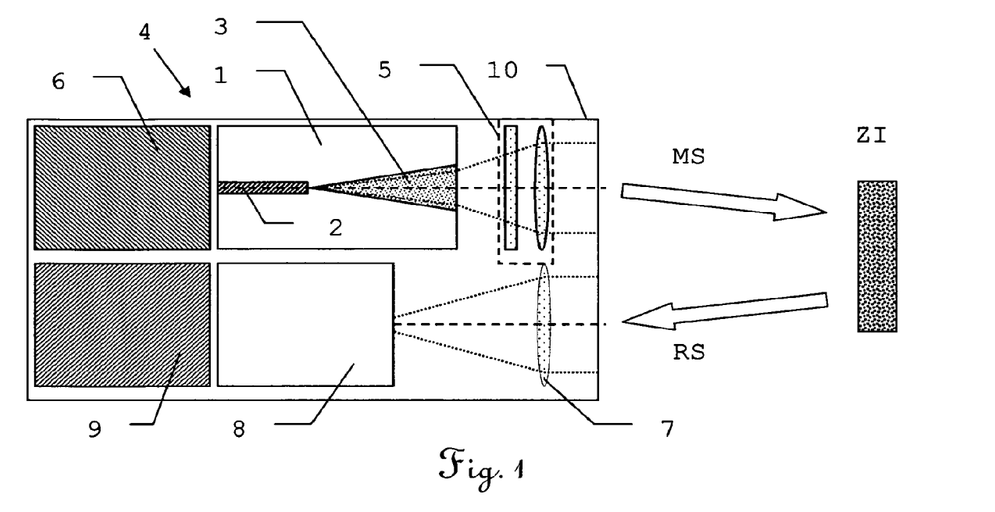
FIG. 1 shows the schematic diagram of a range finder according to the invention comprising a tapered diode laser.

FIG. 1 illustrates the design of a range finder 4 comprising a tapered diode laser 1 in a schematic diagram. The range finder has a tapered diode laser 1 as a laser source of a transmitting optical system 5 for emitting the laser radiation and a laser source control 6. The laser radiation is emitted as measuring radiation ms to a target ZI to be surveyed and is received from there partly as reflected measuring radiation RS by a receiving optical system 7 and a detector 8, the signals of which are evaluated by an evaluation unit 9 with respect to the distance to the target ZI. According to the invention, the transmitting optical system 5 is formed for simultaneous compensation of the influences due to the different emission locations of the radiation of the tapered diode laser 1 in the fast and slow axis. The transmitting optical system 5 thus effects an astigmatism compensation and, simultaneously therewith, collimation of the laser radiation.

The tapered diode laser 1 is shown in the slow axis view with the ridge waveguide 2 and a tapered waveguide 3, adjacent to which is an emitter surface. The ridge waveguide 2 may have a spectral feedback for generating spectral and spatial monomodality, in particular a periodic structuring of the longitudinal refractive index profile. Alternatively, the tapered diode laser 1 may also have an external spectral feedback for generating a spectral and spatial monomodality, in particular via coupling out of the ridge waveguide 2 by means of a partly transparent mirror with a wavelength-selective element.

The laser source control 6 is in the form of a pulse circuit for generating pulsed laser radiation having a pulse duration of less than 500 ns and a pulse peak power of greater than 1 W, the tapered diode laser 1 having a separate supply for ridge waveguide and tapered waveguide. As a result, two different actuation types, for example with different currents for ridge waveguide and tapered waveguide, can be provided, so that the tapered diode laser can be operated with continuous wave actuation for ridge waveguide 2.

Figure 2:
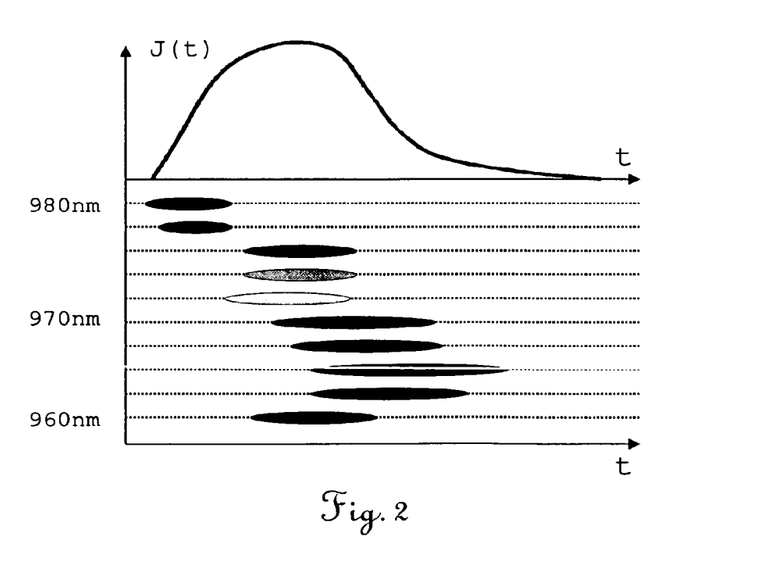
FIG. 2 shows the diagram of a time variation of the mode distribution over the current pulse in a tapered diode laser.

FIG. 2 shows the diagram of a variation of the mode distribution over the current pulse J(t) in a tapered diode laser as a function of time. If a tapered diode laser is electrically operated in the pulsed mode, the energy distribution over the longitudinal modes of the laser varies over the duration of the transient phenomenon of the ridge waveguide, which is illustrated by the time-dependent spectral components for the wavelength range from 960 nm to 980 nm in the lower part of FIG. 2. As a result of this, the spectral distribution of the long-wave region is shifted to the short-wave part, for example over the pulse duration of each laser pulse.

Figure 3:
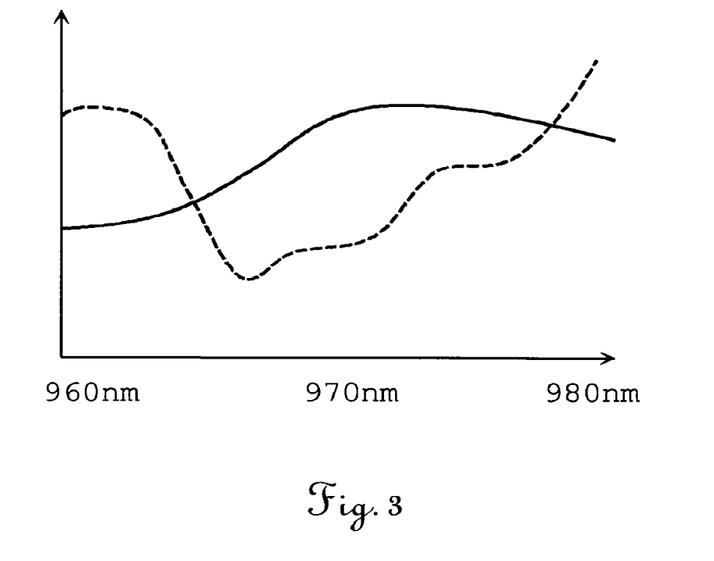
FIG. 3 shows the diagram of a spectral response of the reflectivity of a rough target owing to speckles.

Although customary non cooperative targets do not show steep gradients in their spectral reflectivity, the roughness of the surface may show a strong dependence on the wavelength owing to the generation of speckles in the observation plane, which is illustrated in FIG. 3. The spectrally different response of the reflectivity of a rough target caused by speckles is shown at the same distance but in two different lateral positions.

Figure 4:
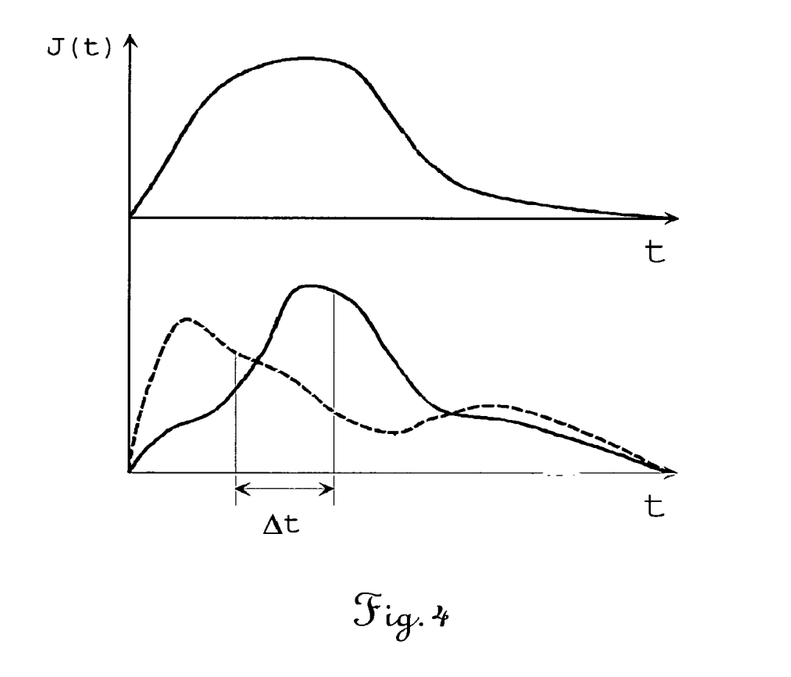
FIG. 4 shows the diagram of a laser pulse and curve of the reflected intensity for two lateral positions.

The effects of laser pulse and variation of the reflected intensity for two lateral positions on the measurements is shown in FIG. 4. In the case of a lateral movement of the measuring beam of the geodetic instrument over the rough surface, a substantial change in the interpreted distance may therefore occur owing to the spectral variation within a laser pulse. Owing to a stronger signal in the short-wave spectrum, which dominates at the beginning of the pulse considered, the dashed position leads to a shift in the centre of gravity with respect to time to the beginning of the pulse, which leads to a different transit time and hence distance measurement than in the second case, which is shown here by a solid line. The time variation of the pulse spectrum is thus converted via the spectral dependence of the received speckled pattern into a variation of the measured distance. In the case of non cooperative targets or rough surfaces of targets to be surveyed, the spectral change during the pulse variation therefore leads to varying measured results for one and the same distance if these are measured for different lateral positions or, for example, the target moves laterally.

Figure 5:
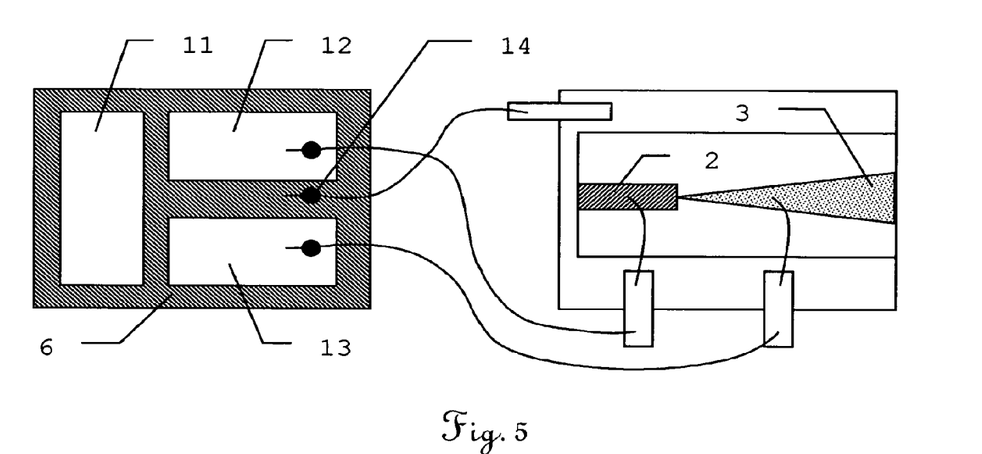
FIG. 5 shows the schematic diagram of a separate supply, according to the invention, of the tapered diode laser.

FIG. 5 shows the schematic diagram of a separate supply, according to the invention, of the tapered diode laser. One possibility for avoiding this behaviour which adversely affects the accuracy of measurement consists in the separate actuation or supply of the ridge waveguide region 2 and of the tapered waveguide region 3. For geodetic applications with their generically required high accuracy of measurement, continuous wave operation of the ridge waveguide 2 is expedient here, which leads to stabilisation of the wavelength. In the case of such continuous wave actuation, the spectral distribution over the longitudinal laser modes remains constant as a function of time over the pulsed amplification of the tapered waveguide 3. Pulsed operation with a plurality of amperes is limited to the tapered waveguide 3.

A corresponding actuating circuit consists, for example, of a supply part 11 with direct current part 12 for the ridge waveguide 2 and a pulse driver for the tapered waveguide 3, a common electrode 14 being used as earth.

Further stabilisation of the spectral distribution for generation of the spectral and spatial monomodality of the ridge waveguide 2 can be achieved via a spectral feedback in this region, in particular periodic structuring of the longitudinal refractive index profile. This is possible, for example, by structuring of the longitudinal refractive index profile along the ridge waveguide, which structuring is typical in the case of DFB (distributed feedback) lasers or DBR (distributed Bragg reflector) lasers.

Alternatively or in addition, external feedback can be realised via coupling out of the ridge waveguide 2 by means of a partly transparent mirror with a wavelength-selective element, such as, for example, a grating or prism.

Figure 6:
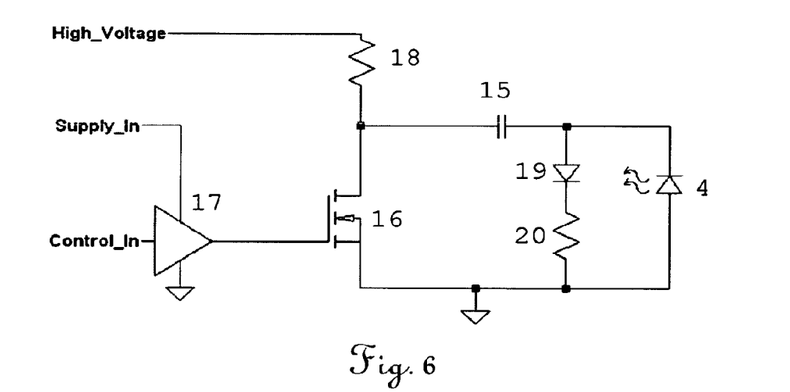
FIG. 6 shows the schematic diagram of a circuit arrangement of the prior art for actuating a tapered diode laser.

FIG. 6 shows the schematic diagram of a circuit arrangement of the prior art for actuating a tapered diode laser. The switching element 16 short-circuits a capacitor 15, charged with high voltage, i.e. typically 20 V to 200 V via a tapered diode laser 4 as an optical element. Alternatively, the optical element can however also be another component which generates light when current flows through, such as, for example, a laser diode, LED or flashlight. As large a part as possible of this energy is output as a light pulse. After such generation of a light pulse, the capacitor 15 is recharged via a charging element 18.

A fast field effect transistor (FET), an avalanche transistor, a bipolar transistor or another element which permits the change between a low-impedance and a high-impedance state can be used as switching element 16. For actuating the switching element, a driver 17 may be used, it being possible for this to be discrete or an IC.

A resistance is typically used as charging element 18 for charging the capacitor 15, it also being possible to use a switching element which becomes high-impedance again after the charging, e.g. a transistor. A first diode 19 has two main functions. Firstly, it serves for discharging the charging current of the capacitor 15; secondly, it serves as a freewheeling diode for the pulse current of the optical element 4. The first diode 19 suppresses oscillation of the circuit formed by the optical element 4, the capacitor 15 and the switching element 16 and prevents a positive voltage applied via the optical element 4.

The optional dissipation element 20 serves for more rapid dissipation of the pulse current of the optical element 4, it being necessary for the dissipation element 20 to be a resistance for high fast currents. Typically, a resistance of a few ohm is used. The dissipation element 20 is required in particular when low-impedance laser diodes are used at high currents.

The disadvantage of such a circuit arrangement of the prior art is that 50% of the energy transferring to the capacitor 15 are lost in the charging element 18. In addition, high voltage is required.

Figure 7:
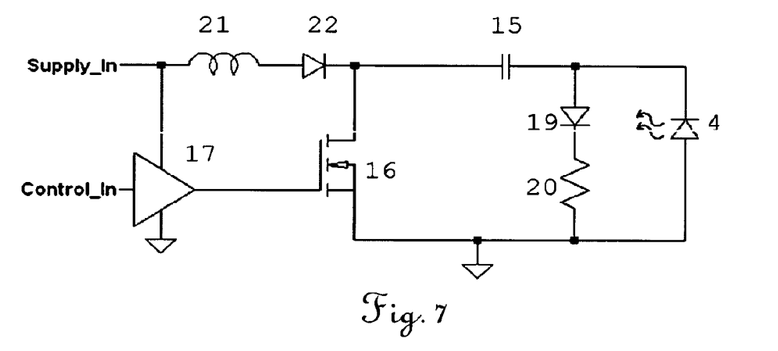
FIG. 7 shows the schematic diagram of a circuit arrangement for actuating a tapered diode laser.

FIG. 7 shows a modified and simplified circuit arrangement for actuating a tapered diode laser as optical element 4, a short, i.e. from a few 100 ps to a few ns depending on optical element 4 and stronger, i.e. from a few 100 mA to more than 100 A, current pulse being generated. In this circuit arrangement, the switching element 16 is used together with an inductance 21 in order to generate a high voltage. The underlying principle is based on the fact that, after generation of a laser pulse, the switching element 16 does not immediately become high-impedance again but remains low-impedance for a certain time span, i.e. is temporarily switched to a low impedance. In this time, the input voltage minus the voltage at the second diode 22 and the switching element 16 is applied via the inductance 21. Consequently, a current builds up in the inductance 21 in this time, so that energy is stored in the inductance 21. As the switching element 16 becomes high-impedance again, the current flows only via the path defined by the capacitor 15, first diode 19 and a dissipation element 20, owing to the persisting current flow in the inductance 21, so that energy is transferred from the inductance 21 to the capacitor 15. The second diode 22 prevents the energy from flowing back from the capacitor 15 to the inductance 21. The capacitor 15 is now charged and the light pulse can be output as in the case of the circuit arrangement according to FIG. 6. The inductance 21 is thus used for temporary storage of energy, it being possible via its inductance value to establish how much energy is stored in a particular time and how fast the energy is dissipated to the capacitor 15. The supply of the tapered diode laser is thus formed in such a way that, after an emitted laser pulse, a switching element 16 used for charging the capacitor 15 is temporarily switched to a low-impedance state, the capacitor 15 being charged via an inductance 21. The advantages of this circuit arrangement over the circuit arrangement of the prior art which is shown in FIG. 6 are that no external high voltage is required, the capacitor 15 can be charged by means of the inductance 21 with substantially lower losses and the power of the pulse can be varied without problems over the duration of charging. In the case of resonant operation, the second diode 22 in the circuit arrangement can also be omitted.

Figures 8, 9:
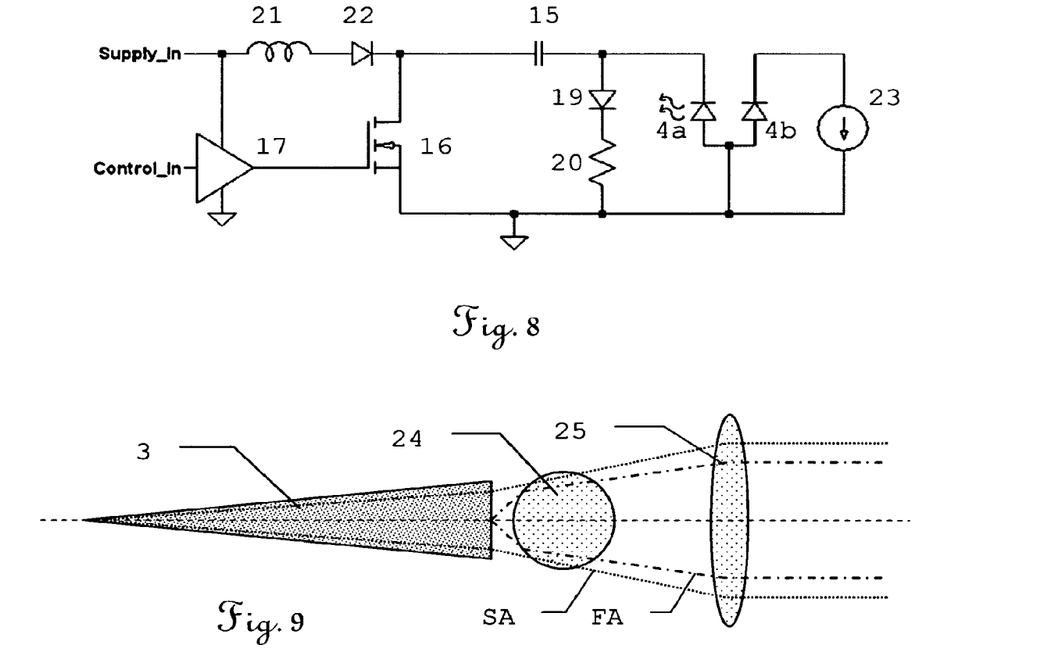
FIG. 8 shows a schematic diagram of a circuit arrangement for actuation, according to the invention, of the tapered diode laser.
FIG. 9 shows the schematic diagram of a first embodiment of the transmitting optical system for a range finder according to the invention.

FIG. 8 schematically shows yet another modified circuit arrangement for actuation, according to the invention, of the tapered diode laser. This circuit arrangement serves for separate supply or actuation of the two regions of the tapered diode laser. Such a tapered diode laser has two anode connections or two cathode connections, a pulse connection 4a and a direct current connection 4b. Here, the circuit arrangement is connected to the pulse connection 4a whereas a direct current source 23, which can typically be in the form of a regulated current source or current-regulated voltage source, is connected to the direct current connection 4b. The supply thus has a direct current source 23 for the ridge waveguide, so that this can be kept in continuous wave operation.

The circuit arrangements shown in FIG. 6-8 are in principle also suitable for actuation and supply of another element to be operated in the pulsed mode and for other intended uses, independently of their use with a tapered diode laser or in a range finder. In particular, these circuit arrangements can also be used with other types of laser diodes or light-emitting components.

The astigmatism compensation for a tapered diode laser and collimation, parallel thereto, of the laser radiation in a first embodiment of the transmitting optical system is shown in FIG. 9 as a schematic diagram with a superposed diagram of the fast and slow axis views or beam paths. The radiation emitted from the tapered waveguide 3 is adapted in the fast axis beam path FA by a cylindrical lens 24 to the divergence of the slow axis beam path SA, a subsequent lens 25, which can preferably be in the form of an aspherical surface, collimates the laser radiation in both axes and emits this as measuring radiation, optionally via further optical components, to the target to be surveyed. The optical parameters can be stated as follows for an example of the first embodiment. In the fast axis, the cylindrical lens 24 is in the form of a gradient index cylindrical lens of f=170 µm with a diameter of 250 µm and is positioned at a distance of about 20 µm from the emitter surface. The lens 25 is an aspherical lens of 19 mm focal length and 6 mm diameter and is arranged after the cylindrical lens 24 at a distance of about 17 mm. The cylindrical lens 24 has a position which deviates by a few µm from the collimation position, in order to permit a residual divergence of 7°, which is comparable with the divergence in the slow axis. The cylindrical lens 24 is therefore slightly out of adjustment and the collimation of the fast axis is produced by the specific combination of cylindrical lens 24 and aspherical lens 25. A symmetrical beam diameter is provided by the choice of the focal length of the cylindrical lens. The aspherical surface subsequently performs the collimation of the pencil of rays. The beam diameter is 4.5 mm and is diffraction-limited with 0.1 mrad.

Figure 10:
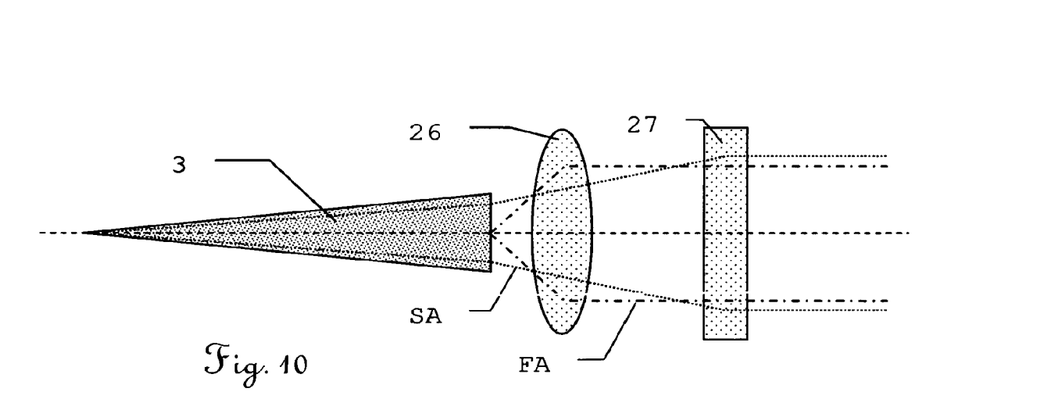
FIG. 10 shows the schematic diagram of a second embodiment of the transmitting optical system for a range finder according to the invention.

FIG. 10 shows the schematic diagram of a second embodiment of the transmitting optical system for a range finder according to the invention, once again with a superposed diagram of the fast and slow axis views or beam paths. In this embodiment, a combination of two cylindrical lenses, which are formed and arranged so that a first cylindrical lens 26 collimates the fast axis beam path FA and a second cylindrical lens 27 collimates the slow axis beam path SA, is used as the transmitting optical system. Thus, the beam paths in the slow and fast axis are collimated independently of one another, which also permits the different emission locations in the tapered diode laser or the astigmatism thereof to be taken into account in an axis-specific manner.

Figure 11:
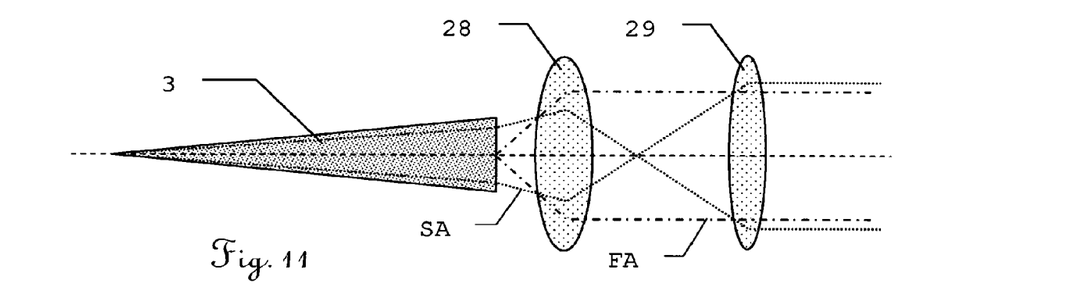
FIG. 11 shows the schematic diagram of a third embodiment of the transmitting optical system for a range finder according to the invention.

A third embodiment of the transmitting optical system for a range finder according to the invention is shown in FIG. 11. In the case of this optical system, a spherical lens 28 or, owing to the high divergence of the fast axis, an aspherical surface, and a cylindrical lens 29 are used. The focal distance of the lens 28 is chosen so that, at the known divergence of the fast axis beam path FA, the desired diameter—this is a few mm for geodetic applications—is achieved in a collimation position for this axis. Since it is a spherical lens, the refractive power also affects the slow axis and leads to an intermediate image. The refractive power of the cylindrical lens 29, which generally need not have an aspherical design, owing to the smaller divergence, is chosen so that the beam diameter of the fast axis beam path FA corresponds to that of the slow axis beam path SA, so that a symmetrical beam cross-section results. Here, the intermediate image of the slow axis is present in the focal plane of the cylindrical lens 29. This combination of a cylindrical lens and a preceding, in particular aspherical, lens 28 modifies the emission so that the lens 28 collimates the laser radiation in the fast axis and the cylindrical lens 29 collimates the laser radiation in the slow axis.

Figure 12:
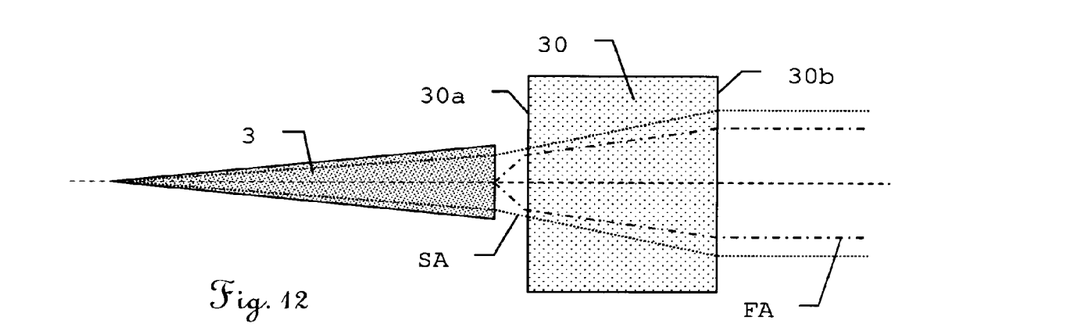
FIG. 12 shows the schematic diagram of a fourth embodiment of the transmitting optical system for a range finder according to the invention and FIG. 13 shows the schematic diagram of a geodetic surveying device according to the invention.

FIG. 12 shows a fourth embodiment of the transmitting optical system in a superposed diagram of the fast and slow axis views or beam paths. In this embodiment, the sequence of two lenses is replaced by a single diffractive element 30, the end face 30a facing the tapered diode laser or the front being formed in such a way that the divergence of the fast axis beam path FA is adapted to the divergence of the slow axis beam path SA and the end face 30b facing away from the tapered diode laser or the back collimates the laser radiation in both axes. Alternatively, the beam path of the second embodiment can also be realised by a single element. An optical system integrated in such a manner therefore combines the effect of a divergence-adapting cylindrical lens or cylindrical lens collimating in the fast axis on the first end face 30a and a rotationally symmetrical or second cylindrical lens on the second end face 30b of the diffractive element 30, so that only one optical element is required for beam shaping.

The optical systems shown in FIGS. 9-12 can in principle also be used independently of their use with a tapered diode laser actuated by the separate supply. In particular, these transmitting optical systems can also be used with other types of tapered diode lasers for astigmatism correction and collimation.

Figure 13:
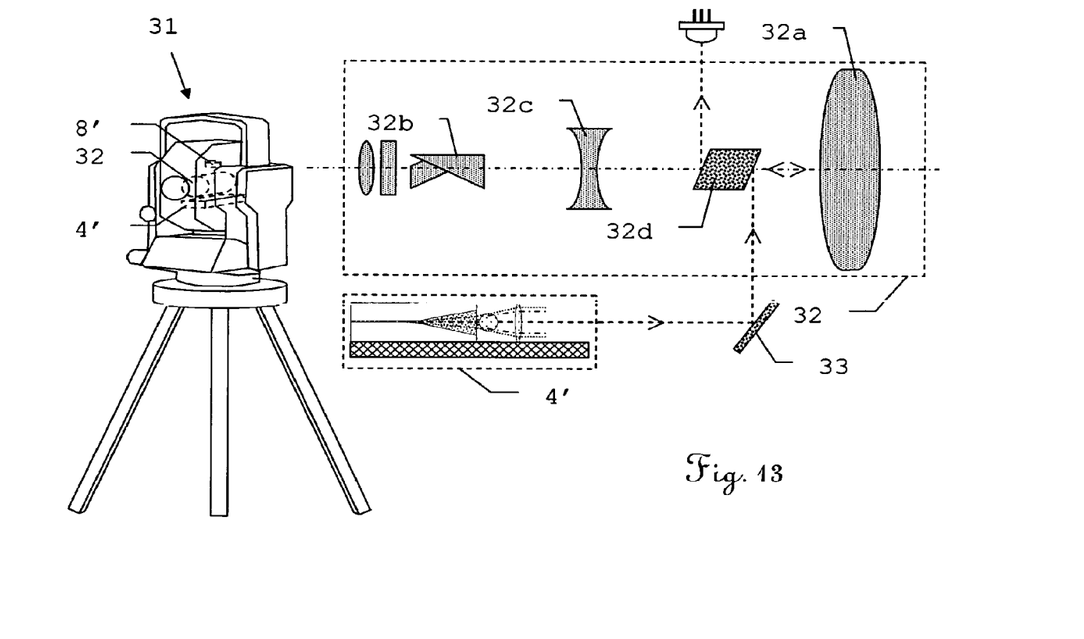

FIG. 13 shows the schematic diagram of a tacheometer as an example of a geodetic surveying device 31 according to the invention, comprising an electro-optical range finder whose components and functionality in this example are arranged distributed in the surveying device 31 and are therefore constructionally integrated. The transmitting component 4' of the range finder, i.e. laser source with laser source control and transmitting optical system, and the optical system 32 and a detector 8' for detecting targets to be surveyed are present as components in the housing of the surveying device 31.

The laser radiation is emitted by a radiation-generating tapered diode laser and the downstream transmitting optical system and is coupled into the optical system 32 of the surveying device 31 via a beam-deflecting component 33. The optical system 32 for detecting and surveying targets has an objective lens 32a and an eyepiece unit 32b. Between these components is a focussing member 32c and a reflective deflection means 32d, with the aid of which the radiation originating from the transmitting component 4' and coupled into the beam path of the optical system 32 is emitted via the objective lens 32a. Radiation reflected back from a target is in turn picked up by the objective lens 32a and a part of the radiation is guided by the reflective deflection means 32d onto the detector 8'.

In this arrangement, the radiation of the transmitting component 4' can be used in cooperation with the detector 8' for a distance measurement to a target. The example shown is only one of many possible embodiments of geodetic surveying devices according to the invention and serves for an exemplary illustration of a possible cooperation of components.

Of course, these figures shown schematically represent only examples of possible embodiments. Thus, the components used can also be used according to the invention in other configurations and sequences. In addition, it is within the scope of the person skilled in the art to use supplementary or alternative optical components, for example having a diffractive effect, and components of the same or similar effect or functionality which are generally used in laser physics or laser technology.

The invention claimed is:

1. An electro-optical range finder, comprising:
 a laser source having a laser source control for generating pulsed laser radiation having a pulse duration of less than 500 ns and a pulse peak power greater than 1 W;
 a transmitting optical system for emission of the laser radiation as measuring radiation to a target to be surveyed;
 a receiving optical system and a detector having an evaluation unit for receiving and evaluating the measuring radiation reflected by the target, in order to measure distance, wherein:
  the laser source has a tapered diode laser with a separate supply for a ridge waveguide and a tapered waveguide; and
  the transmitting optical system is formed for astigmatism compensation and for collimation of the laser radiation.

2. A range finder according to claim 1, wherein the separate supply provides two different currents for the ridge waveguide and the tapered waveguide.

3. A range finder according to claim 1, wherein the tapered diode laser has a continuous wave actuation for the ridge waveguide.

4. A range finder according to claim 1, wherein the tapered diode laser has a spectral feedback in the ridge waveguide for generating a spectral and spatial monomodality.

5. A range finder according to claim 1, wherein the tapered diode laser has a spectral feedback in the ridge waveguide for generating a spectral and spatial monomodality by a periodic structuring of the longitudinal refractive index profile.

6. A range finder according to claim 1, wherein the tapered diode laser has an external spectral feedback for generating a spectral and spatial monomodality via coupling out of the ridge waveguide by means of a partly transparent mirror with a wavelength-selective element.

7. A range finder according to claim 1, wherein the supply having a capacitor used for energy supply to the tapered diode laser is formed in such a way that, after an emitted laser pulse, a switching element used for charging the capacitor is temporarily switched to low impedance, the capacitor being charged via an inductance.

8. A range finder according to claim 1, wherein the supply has a direct current source for the ridge waveguide.

9. A range finder according to claim 1, wherein the supply has a direct current source for the ridge waveguide by a regulated current source or a current-regulated voltage source.

10. A range finder according to claim 1, wherein the transmitting optical system has one of the following alternatives:
 a combination of a cylindrical lens and a subsequent aspherical lens, the cylindrical lens being a gradient index cylindrical lens or an aspherical cylindrical lens being formed and arranged so that the divergence in the fast axis is adapted to the divergence in the slow axis and the lens collimating the laser radiation in both axes;
 combination of two cylindrical lenses which are formed and arranged so that a first cylindrical lens collimates the laser radiation in the fast axis and a second cylindrical lens collimates the laser radiation in the slow axis;
 combination of a cylindrical lens and an upstream aspherical lens, the aspherical lens collimating the laser radiation in the fast axis and the cylindrical lens collimating the laser radiation in the slow axis; or
 a monolithic or multi-part diffractive element, an end face of the element facing the tapered diode laser and being formed so that divergence in the fast axis is adapted to the divergence in the slow axis and the end face facing away from the tapered diode laser collimating the laser radiation in both axes.

11. A range finder according to claim 1, wherein the transmitting optical system is formed for generating a substantially circular or square beam cross-section of the laser radiation.

12. A range finder according to claim 1, wherein the transmitting optical system has a monomodal fibre for beam guidance.

13. A geodetic surveying device in the form of a total station, tacheometer or laser scanner comprising a range finder according to claim 1.

14. A method comprising generating pulsed laser radiation having a pulse duration of less than 500 ns and a pulse peak power greater than 1 W in a range finder having a laser source with transmitting optical system for emission of the laser radiation as collimated measuring radiation to a target to be surveyed, wherein the laser source has a tapered diode laser whose ridge waveguide and tapered waveguide are separately actuated.

15. A method according to claim 14, further comprising continuous wave operation for the ridge waveguide.

16. A method according to claim 14, further comprising generation of spectral and spatial monomodality by spectral feedback.

17. A method according to claim 14, further comprising temporary switching of a switching element to the low-impedance state, the switching element being used for charging, via an inductance, a capacitor used for the energy supply to the tapered diode laser.

* * * * *